United States Patent [19]

Hu

[11] Patent Number: 5,180,058
[45] Date of Patent: Jan. 19, 1993

[54] EXPANDABLE DISC HOLDER ASSEMBLY

[75] Inventor: James Hu, Shin-Tien, Taiwan

[73] Assignee: Pro Eton Corporation, Taipei, Taiwan

[21] Appl. No.: 797,207

[22] Filed: Nov. 25, 1991

[51] Int. Cl.⁵ .............................................. B65D 85/57
[52] U.S. Cl. ..................................... 206/309; 206/310; 206/444; 211/40; 211/55; 312/9.43; 312/9.58; 312/901
[58] Field of Search ............................. 206/309-312, 206/444, 425; 211/40, 55; 312/312, 9.43, 901, 9.58

[56] References Cited

U.S. PATENT DOCUMENTS

| 4,083,456 | 4/1978 | Genn et al. | 211/55 |
| 4,702,369 | 10/1987 | Philosophe | 206/312 |
| 4,765,469 | 8/1988 | Seifert | 206/309 |
| 4,817,792 | 4/1989 | Seifert | 206/309 |
| 4,871,218 | 10/1989 | Swinson | 312/312 |

FOREIGN PATENT DOCUMENTS 0420350  4/1991  European Pat. Off. ............ 206/310

Primary Examiner—Bryon P. Gehman
Attorney, Agent, or Firm—Bacon & Thomas

[57] ABSTRACT

A disc holder assembly including front and back cartridges defining flat outer surfaces of the assembly and one or more intermediate cartridges detachably and pivotably secured to the front and back cartridges or to each other to permit the insertion into or removal from each intermediate cartridge of a floppy diskette or compact disc when the assembly is pivoted into an open position forming a cylindrical sector.

3 Claims, 5 Drawing Sheets

EXPANDABLE DISC HOLDER ASSEMBLY

BACKGROUND OF THE INVENTION

1. Field of the Invention

The present invention relates to a structure for holding discs, and particularly to a holder composed of a plurality of cartridges which can be expanded for storing a plurality of floppy diskettes or compact discs.

2. Description of the Prior Art

Generally, floppy diskettes or compact discs are individually packed for convenience purposes. However, an appropriate container is required to keep a plurality of such floppy diskettes or compact discs together. Normally, the number of floppy diskettes or compact discs collected by an individual increases gradually, so the container must be replaced by a larger container in order to accommodate the increased number of floppy diskettes or compact discs. This is a very inconvenient manner of storage. There is a known type of container designed to store a certain number of floppy diskettes or compact discs, but its size is limited and it cannot be expanded to permit the storage of additional floppy diskettes or compact discs. This container also cannot be separated to serve as a package for a single floppy diskette or compact disc.

SUMMARY OF THE INVENTION

The main object of the present invention is to provide a disc holder assembly composed of a plurality of cartridges, wherein the number of cartridges in each assembly can be increased or decreased as desired, and the assembly can be opened into the general shape of cylindrical sector for viewing, storing or removing individual floppy diskettes or compact discs.

Another object of the present invention is to provide a disc holder assembly of simple construction and comprising a plurality of intermediate cartridges having the same structure so that there is a common wall between two adjacent cartridges for placing a floppy diskette or compact disc in order to maximize the capacity of the assembly.

DETAILED DESCRIPTION OF THE PREFERRED EMBODIMENTS

Figure 1:
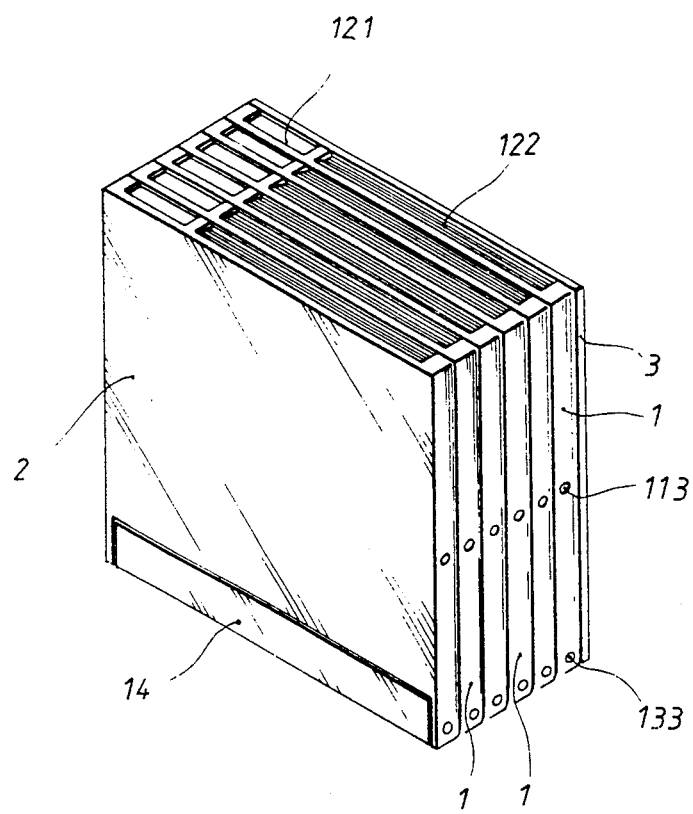
FIG. 1 is a perspective view of a disc holder assembly according to the present invention and shown in a closed position.
Figure 2:
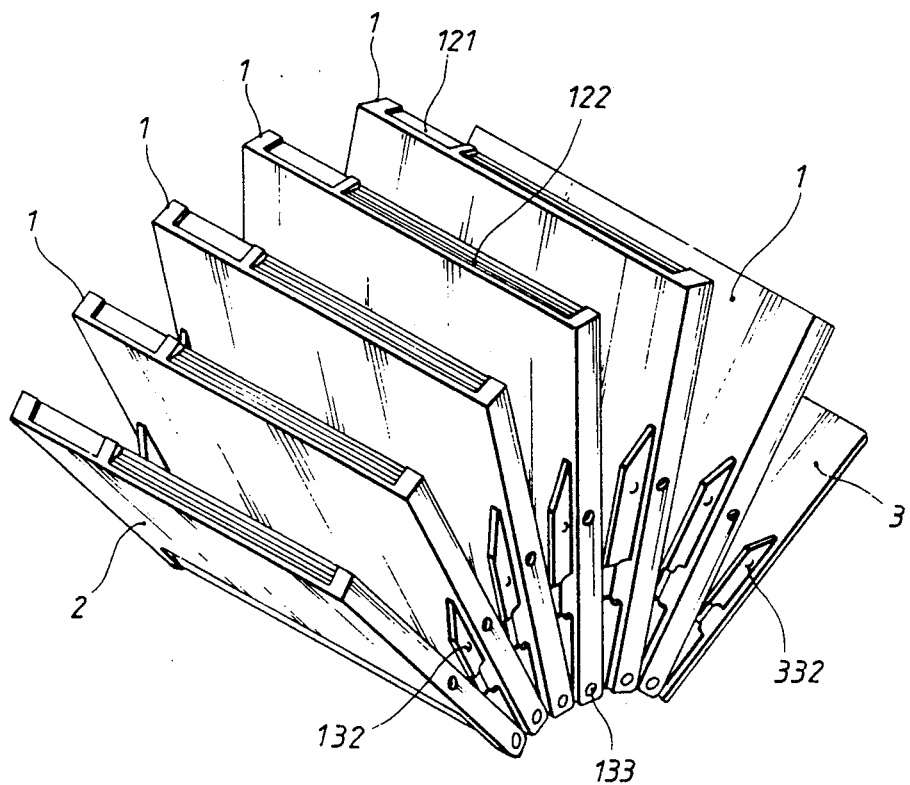
FIG. 2 is a perspective view of the disc holder assembly shown in an open position.

As shown in FIGS. 1 and 2, the disc holder assembly of the present invention mainly comprises a plurality of intermediate cartridges 1 assembled together with a front cartridge 2 at the front and a back cartridge 3 at the back of the assembly.

Figure 3:
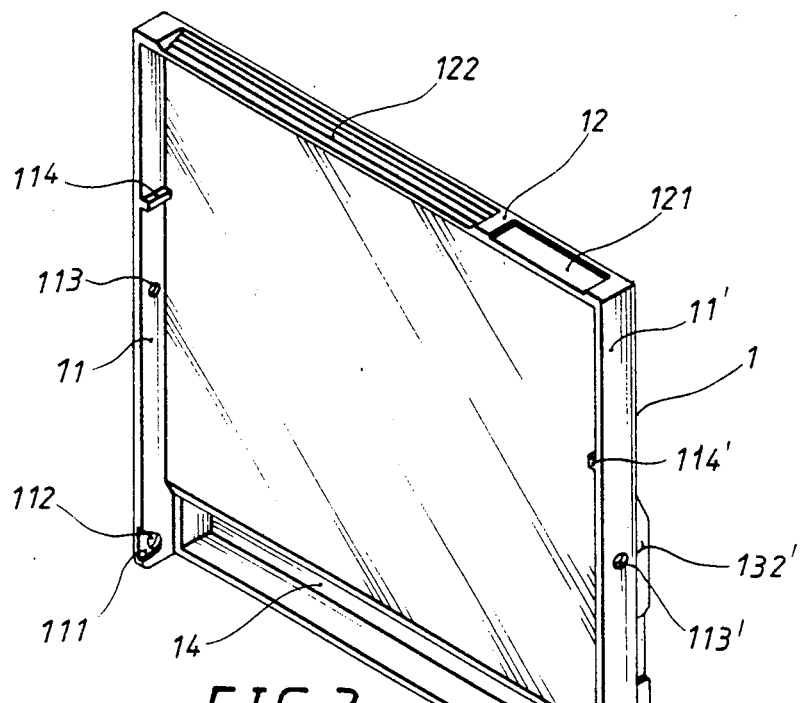
FIG. 3 is a perspective view of one side of an intermediate cartridge.
Figure 4:
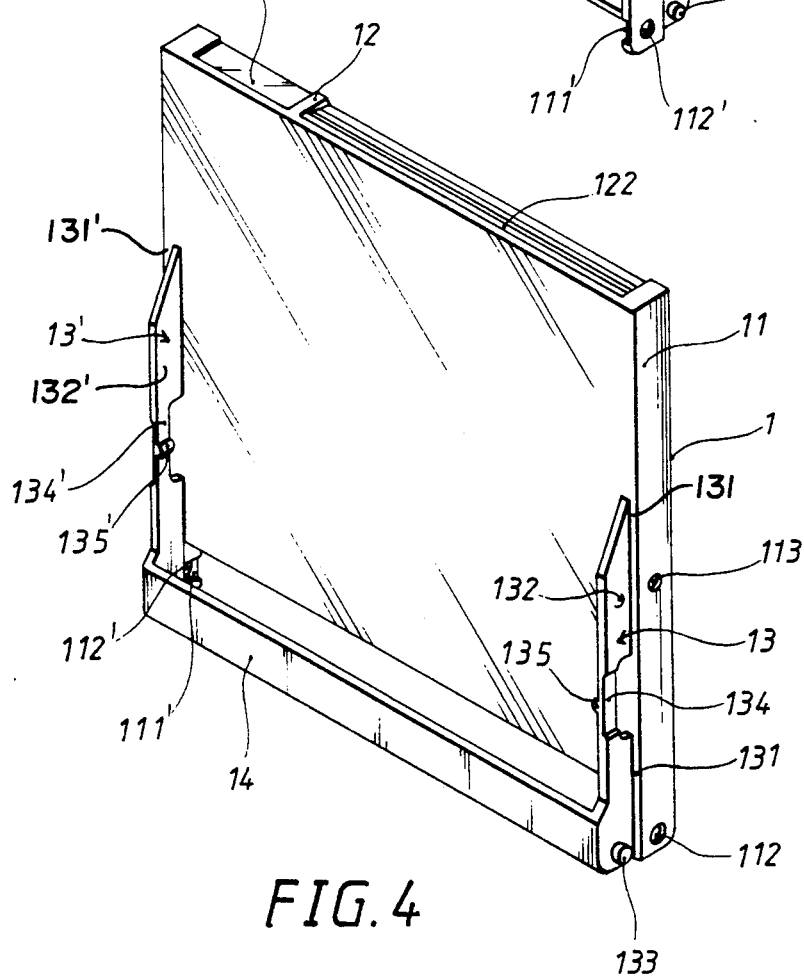
FIG. 4 is a perspective view of another side of the intermediate cartridge.

As more particularly shown in FIGS. 3 and 4, each intermediate cartridge 1 is generally in the form of a cover structure having a pair of opposed sidewalls 11 and 11' and a top wall 12 around its peripheral edges. Sidewalls 11 and 11' are provided with curved notches 111 and 111', respectively, at their lower ends. Notches 111 and 111' face inwardly and are provided with respective positioning holes 112 and 112' formed therethrough. A pair of stop holes 113 and 113' are formed through the middle portions of sidewalls 11 and 11', respectively. Sidewalls 11 and 11' are also provided with respective ribs 114 and 114' on their inner surfaces. A labeling area 121 is provided on the outer surface of top wall 12 adjacent a recessed area 122 defined by a plurality of transverse strips for engagement by a finger during handling of cartridge.

As seen in FIG. 4, the other side of intermediate cartridge 1 is provided with a pair of outwardly extending flange elements 13 and 13' at opposed lateral sides thereof. Flange elements 13 and 13' are each spaced inwardly from its corresponding edge of cartridge 1 to define respective stepped portions 131 and 131'. Elements 13 and 13' are each defined by a respective flap 132 and 132' formed on their upper portions, and are also provided with outwardly extending positioning stubs 133 and 133' on the outer sides of their lower portions. Element 13 is provided with a flexible thin portion 134 in its middle portion and an inwardly extending rib 135 formed on the inner side of thin portion 134. Similarly, element 13' is also provided with a flexible thin portion 134' having an inwardly extending rib 135' formed on its inner side. An extension plate 14 connects the lower portions of elements 13 and 13', with plate 14 being disposed parallel to and spaced from the planar surface of cartridge 1. As seen in FIG. 3, extension plate 14 is provided with a straight connecting element 141 extending along and forming a bottom wall of cartridge 1.

Figure 5:
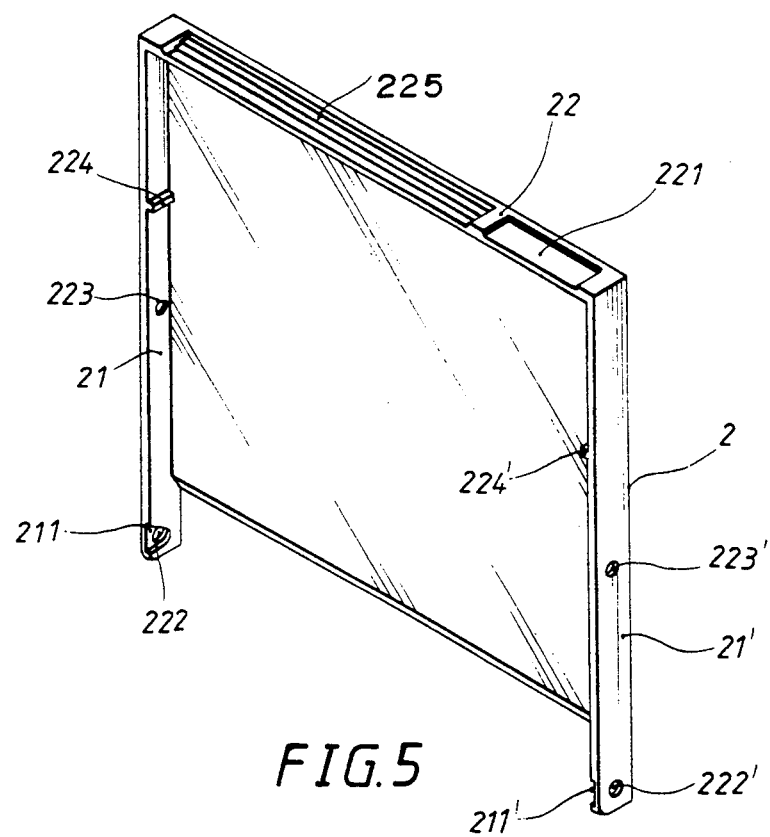
FIG. 5 is a perspective view of one side of a front cartridge.

As shown in FIG. 5, the front cartridge 2 has a configuration similar to that of cartridge 1 in that it is also substantially in the form of a cover structure having a pair of opposed sidewalls 21 and 21', and a top wall 22. Sidewalls 21 and 21' are provided with a pair of curved notches 211 and 211', respectively, which are in turn provided with respective positioning holes 222 and 222' therethrough. A pair of stop holes 223 and 223' are formed through the middle portions of sidewalls 21 and 21', respectively. As also seen, sidewalls 21 and 21' are provided with respective ribs 224 and 224' on their inner sides. A labeling area 221 is provided on top wall 22 adjacent a recessed area 225 defined by a plurality of transverse stripes. The other side of front cartridge 2, not shown in FIG. 5, is in the form of a flat surface.

Figure 6:
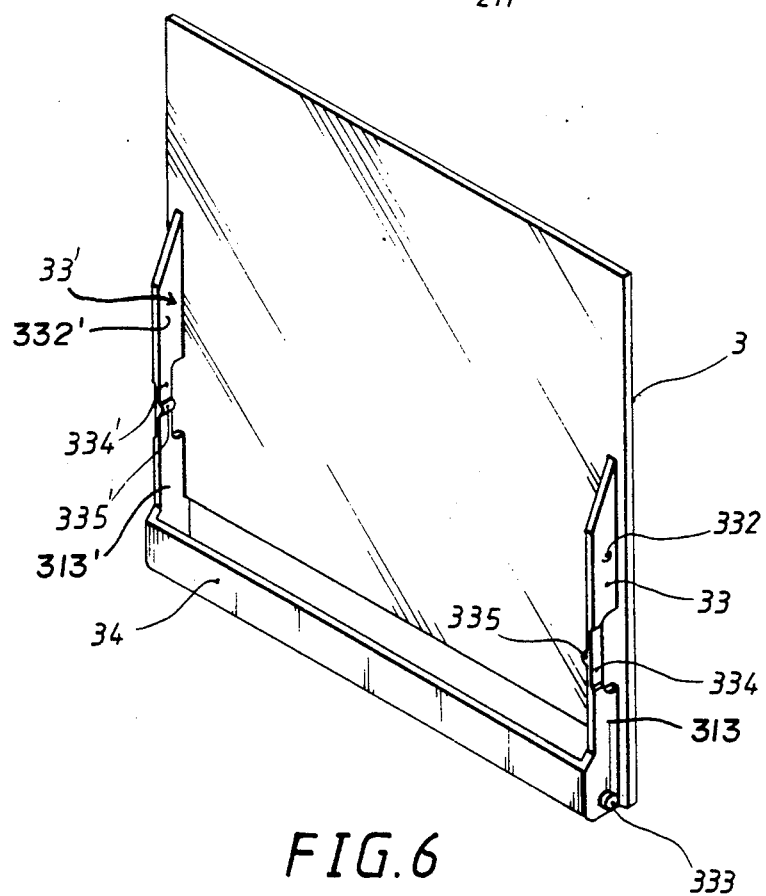
FIG. 6 is a perspective view of one side of a back cartridge.

As shown in FIG. 6, back cartridge 3 has a structural configuration which is similar to that shown for cartridge 1 in FIG. 4. Essentially, there is provided a pair of outwardly extending flange elements 33 and 33' on opposite lateral sides of cartridge 3. Elements 33 and 33' are defined by a pair of respective flaps 332 and 332' forming the upper portions thereof. A positioning stub 333 extends outwardly from a lower portion 313 of element 33 and a similar positioning stub 333' extends outwardly from a lower portion 313' of element 33'. As also seen, elements 33 and 33' are provided with flexible thin middle portions 334 and 334', with corresponding inwardly extending ribs 335 and 335', respectively, formed on the inner surfaces of portions 334 and 334'. An extension plate 34 is connected to the lower portions 313 and 313', with plate 14 being provided with a straight connecting element, similar to element 141 shown in FIG. 3, on the bottom thereof. The other side of cartridge 3 shown in FIG. 6 is formed with a flat surface.

The above components are designed to permit the individual intermediate cartridges 1 to be joined together by inserting the stubs 133 and 133' on each side of each cartridge 1 into the corresponding positioning holes 112 and 112' on each side of an adjacent cartridge 1. This serves to hinge a plurality of cartridges 1 together for pivotal movement relative to each other, so that any one of the cartridges 1 may be opened and accessed for placing a floppy diskette or compact disc within the space defined by the extension plate 14 and straight connecting element 141 on the bottom thereof. The floppy diskette or compact disc is also retained within cartridge 1 by the ribs 135 and 135' on the thin portions 134 and 134' of flange elements 13 and 13'. Therefore, the insertion and removal of a floppy diskette or compact disc with respect to cartridge 1 is easily accomplished, particularly since cartridges 1 may be pivoted open to form a cylindrical sector, as shown in FIG. 2. Moreover, the number of cartridges 1 in the entire assembly can be increased or decreased as desired.

As also apparent from the disc holder assembly described above, the front cartridge 2 and the back cartridge 3 are secured to their respective adjacent intermediate cartridges 1 in the same way, so that the outermost ends of the disc holder assembly are defined by the exterior flat surfaces of cartridges 2 and 3.

Figure 7:
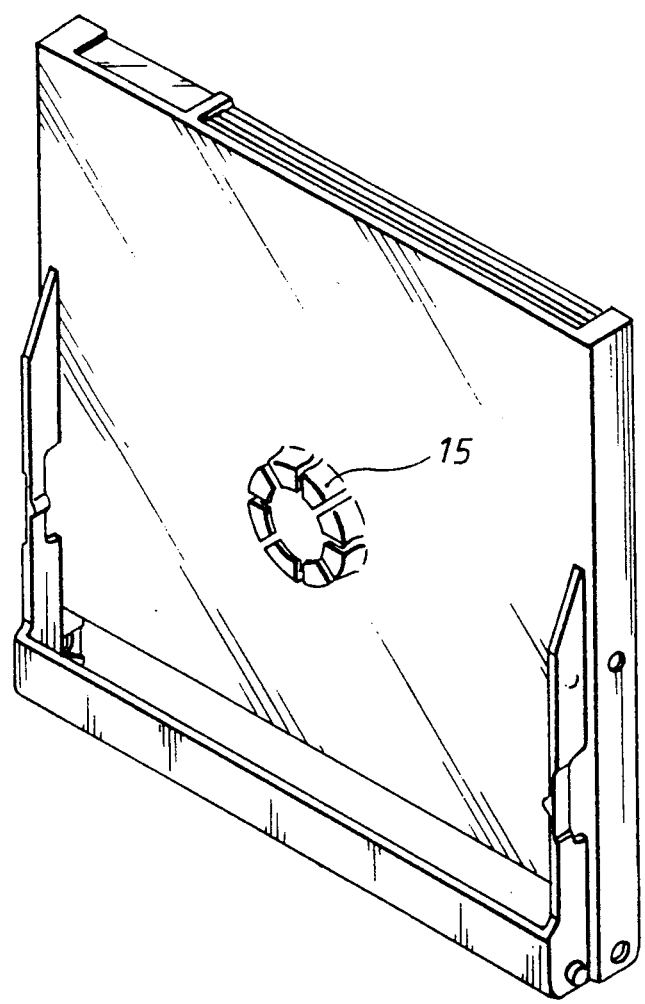
FIG. 7 is a perspective view of a second embodiment of the intermediate cartridge.

Moreover, as shown in FIG. 7, an annular positioning seat 15 can be formed in the middle of the front side of cartridge 1 between flange elements 13 and 13', by a pressing or other known conventional procedure, in order to provide means for retaining a compact disc within cartridge 1.

Figure 8:
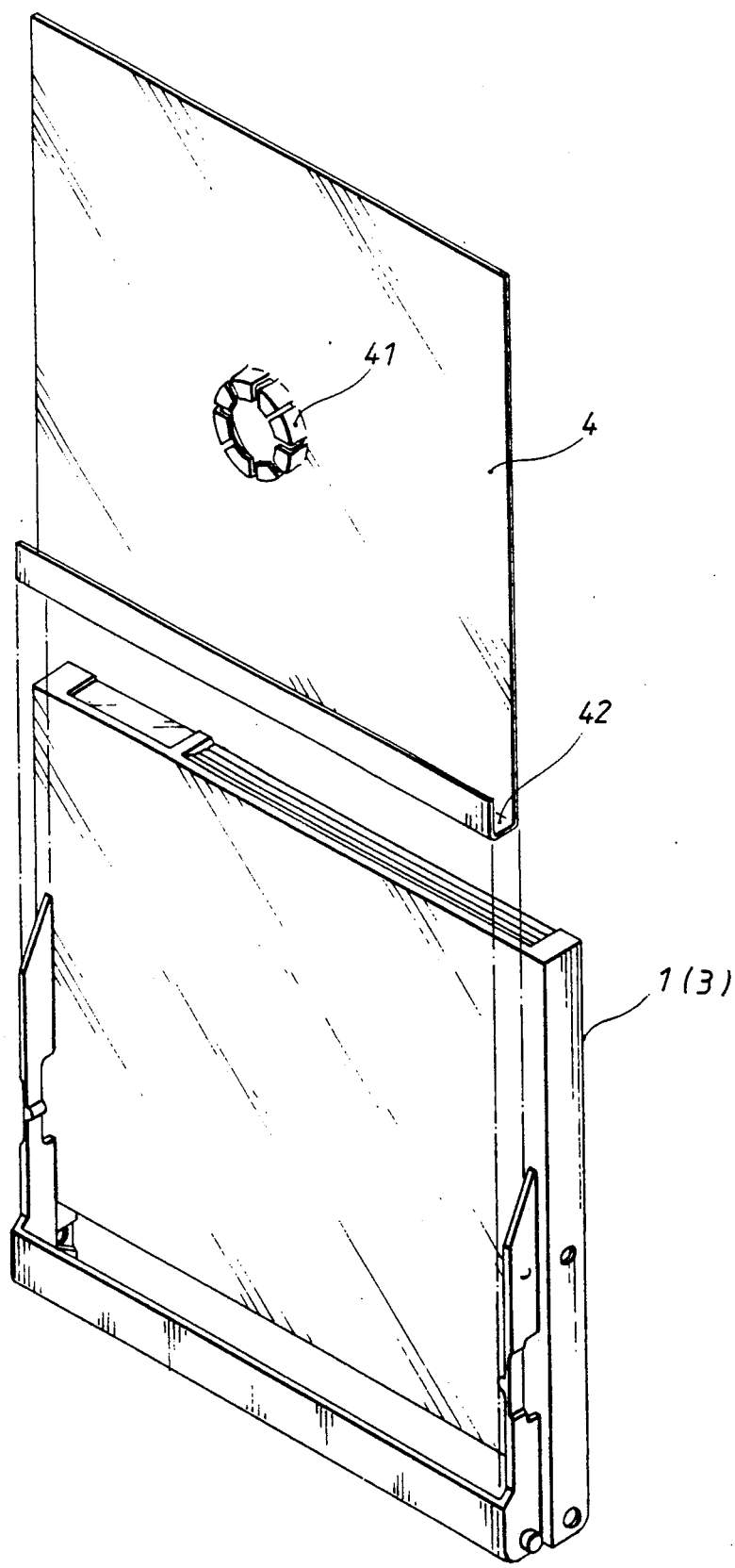
FIG. 8 is an exploded perspective view of a third embodiment of an intermediate cartridge provided with an adapter plate.

The present invention can also include an adapter plate 4, as shown in FIG. 8. Plate 4 is provided with an annular positioning seat 41 in the middle portion thereof and is provided with a rectangular channel 42 formed at its bottom for insertion within cartridge 1 to position and secure a compact disc therein.

I claim:
1. An expandable disc holder assembly comprising:
a) a front cartridge including substantially flat inner and outer surfaces, a pair of sidewalls, a top wall, a curved notch formed at a bottom portion of each sidewall, a positioning hole extending through each curved notch, and a rib formed on an inner surface of each sidewall;
b) a back cartridge including substantially flat inner and outer surfaces, a pair of flange elements extending outwardly from the inner surface, each flange element being spaced inwardly from an adjacent side edge of the cartridge to form a stepped portion therewith, each flange element being defined by an upper portion, a lower portion, a flexible portion between the upper and lower portions, a rib extending from an inner side of the flexible portion, a positioning stub extending outwardly from the lower portion, an extension plate connecting the lower portions of the flange elements and spaced from the inner surface, and a straight connecting element extending along the bottom of the extension plate between the lower portions of the flange elements to form a bottom wall;
c) at least one intermediate cartridge including substantially flat first and second surfaces; a pair of sidewalls, a top wall, a curved notch formed at a bottom portion of each sidewall, a positioning hole extending through each curved notch, a rib on an inner surface of each sidewall, a pair of flange elements extending outwardly from the first surface, each flange element being spaced inwardly from an adjacent side edge of the cartridge to form a stepped portion therewith, each flange element being defined by an upper portion, a lower portion and a flexible portion between the upper and lower portions, a rib formed on an inner side of the flexible portion, a positioning stub extending outwardly from the lower portion, an extension plate connecting the lower portions and spaced from the first surface, and a straight connecting element extending along the bottom of the extension plate between the bottom portions of the flange elements to form a bottom wall; and
d) wherein the front cover may be pivotally secured to the first side of the intermediate cartridge by disposing the positioning stubs of the intermediate cartridge through the positioning holes of the front cartridge and the back cartridge may be pivotally secured to the second side of the intermediate cartridge by disposing the positioning stubs of the back cartridge through the positioning holes of the intermediate cartridge, thereby permitting the front, intermediate and back cartridges to be pivoted between open and closed positions wherein the assembly is in substantially the form of a cylindrical sector when in the open position.

2. The disc holder assembly of claim 1 further including an annular seat formed in the middle of the first side of the intermediate cartridge for positioning a compact disc therein.

3. The disc holder assembly of claim 1 further including an adapter plate provided with an annular seat in the middle thereof and a bottom channel along a lower edge thereof for detachable insertion within the space between the extension plate and the first surface of the intermediate cartridge.

* * * * *